US011043995B2

United States Patent
Nardozza

(10) Patent No.: US 11,043,995 B2
(45) Date of Patent: Jun. 22, 2021

(54) INTERFERENCE REDUCTION IN CELLULAR COMMUNICATION SYSTEMS

(71) Applicant: Blue Danube Systems, Inc., Warren, NJ (US)

(72) Inventor: Gregg S. Nardozza, Madison, NJ (US)

(73) Assignee: Blue Danube Systems, Inc., New Providence, NJ (US)

( * ) Notice: Subject to any disclaimer, the term of this patent is extended or adjusted under 35 U.S.C. 154(b) by 78 days.

(21) Appl. No.: 16/433,843

(22) Filed: Jun. 6, 2019

(65) Prior Publication Data

US 2019/0379438 A1    Dec. 12, 2019

Related U.S. Application Data

(60) Provisional application No. 62/681,825, filed on Jun. 7, 2018.

(51) Int. Cl.
*H04B 7/06* (2006.01)
*H04W 16/28* (2009.01)

(52) U.S. Cl.
CPC .......... *H04B 7/0617* (2013.01); *H04W 16/28* (2013.01)

(58) Field of Classification Search
CPC ............................ H04B 7/0617; H04W 16/28
See application file for complete search history.

(56) References Cited

U.S. PATENT DOCUMENTS

| | | | | |
|---|---|---|---|---|
| 2002/0094823 | A1* | 7/2002 | Suzuki | H01Q 19/12 455/456.5 |
| 2005/0053003 | A1* | 3/2005 | Cain | H04L 45/16 370/235 |
| 2010/0105403 | A1* | 4/2010 | Lennartson | H04L 1/1822 455/450 |
| 2013/0201938 | A1* | 8/2013 | Seol | H04W 72/1284 370/329 |
| 2014/0185481 | A1* | 7/2014 | Seol | H04W 52/24 370/252 |
| 2016/0056523 | A1* | 2/2016 | Olsson | H04B 17/12 342/359 |
| 2016/0301457 | A1 | 10/2016 | Liang | |
| 2017/0111164 | A1 | 4/2017 | Wyville | |
| 2019/0089446 | A1* | 3/2019 | Zhang | H04L 27/2607 |

* cited by examiner

*Primary Examiner* — Mohammad S Anwar
(74) *Attorney, Agent, or Firm* — Occhiuti & Rohlicek LLP

(57) ABSTRACT

A method of using a phased array antenna system to communicate with a mobile user equipment (UE), the method involving: repeatedly switching between a downlink (DL) transmission time period and an uplink (UL) transmission time period; during the DL transmission time period, simultaneously generating a DL transmit beam and a DL receive beam, wherein the DL transmit beam during the DL transmission time periods has a first DL transmit beam pattern; and during the UL transmission time period, simultaneously generating a DL transmit beam and a DL receive beam, wherein the DL transmit beam during the UL transmission time period has a second DL transmit beam pattern and wherein the second DL transmit beam pattern during the UL transmission time period is different from the first DL transmit beam pattern during the DL transmission time period.

9 Claims, 7 Drawing Sheets

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Fig. 1

INTERFERENCE REDUCTION IN CELLULAR COMMUNICATION SYSTEMS

This application claims the benefit under 35 U.S.C. 119(e) of Provisional Application Ser. No. 62/681,825, filed Jun. 7, 2018, entitled "Interference Reduction in Cellular Communication Systems," the entire contents of which are incorporated herein by reference.

TECHNICAL FIELD

Embodiments of the invention generally relate to operational modes of a phased array antenna system and more specifically to the beam characteristics employed during such operational modes.

BACKGROUND

In LTE TDD (Long-Term Evolution Time Division Duplex) systems, transmission and reception share the same frequency band and are time-shared in a half-duplex arrangement consisting of alternating DL (downlink) and UL (uplink) transmission times with a variable duty cycle. A summary of the TDD operational modes is shown in FIG. 1 which shows a chart taken from 3GPP 36.211 (Physical Channels and Modulation) v14.0.0, Section 4.2. The LTE frame is 10 ms long and is divided into ten subframes each 1 ms long. This chart presents seven uplink-downlink configurations that are available. There are both 5 ms and 10 ms periodicities. For the 5 ms periodicities, the pattern repeats every half frame; for the 10 ms periodicities, the pattern repeats every frame. This enables base station to dynamically change the uplink and downlink balance. In the chart, designation D identifies the period of downlink transmission, U identifies the period for uplink transmission, and S is a special subframe which is used for downlink and uplink pilot time slots and a guard period.

There is a 3GPP 36.104 specification for maximum downlink transmitter residual power level that is permitted during the UL transmission time to insure that the UE (user equipment) transmissions to the base station are not interfered with. This level is −85 dBm/MHz at the antenna connector. Using a conventional remote radio head (RRH) (i.e., non-phased array), during DL transmission times, the LTE carrier power may be 30 W for a 10 MHz LTE carrier (equivalent to roughly 35 dBm/MHz). During UL transmission times, 3GPP states that the minimum DL transmit power must be less than −85 dBm/MHz. That is a difference of 120 dB. This makes the implementation of the transmitter very difficult and expensive. Achieving this low residual power level can be challenging, requiring high switch isolation, low on-board leakage, and perhaps switching off the power amplifier bias. Excessive Tx residual power levels from the base station act to raise the interference level during UL transmission times, thus requiring the UEs to deliver higher power to achieve the desired signal to noise ratio required for successful transmission to the base station. This is undesirable as it limits the usable cell radius of the TDD system.

SUMMARY

In general, in one aspect, the invention features a method of using a phased array antenna system to communicate with a mobile user equipment (UE). The method involves: repeatedly switching between a downlink (DL) transmission time period and an uplink (UL) transmission time period; during the DL transmission time period, simultaneously generating a DL transmit beam and a DL receive beam, wherein the DL transmit beam during the DL transmission time period has a first DL transmit beam pattern; and during the UL transmission time period, simultaneously generating a DL transmit beam and a DL receive beam, wherein the DL transmit beam during the UL transmission time period has a second DL transmit beam pattern and wherein the second DL transmit beam pattern during the UL transmission time period is different from the first DL transmit beam pattern during the DL transmission time period.

Other embodiments include one or more of the following features. The second DL transmit beam pattern during the UL transmission time period is substantially different from the first DL transmit beam pattern during the DL transmission time period. The first DL transmit beam pattern during the DL transmission time period has a main lobe and the second DL transmit beam pattern during the UL transmission time period has a main lobe, wherein the main lobe of the first DL transmit beam pattern during the DL transmission time period is directed at the UE, and wherein the main lobe of the second DL transmit beam pattern during the UL transmission time period is directed away from the UE. More specifically, the main lobe of the second DL transmit beam pattern during the UL transmission time period is directed away from the UE in an azimuthal direction or in an elevational direction, or both. The first DL transmit beam pattern during the DL transmission time period has a main lobe, multiple side lobes, and multiple nulls and wherein the second DL transmit beam during the UL transmission time period has a main lobe, multiple side lobes, and multiple nulls, wherein the main lobe of the first DL transmit beam pattern during the DL transmission time period is directed at the UE, and wherein second DL transmit beam pattern during UL transmission time period is directed so that the UE lies within one of the multiple nulls of the second DL transmit beam pattern. Alternatively, the first DL transmit beam pattern during the DL transmission time period has a main lobe and the second DL transmit beam pattern during the UL transmission time period has a main lobe, wherein the main lobe of the first DL transmit beam pattern during the DL transmission time period is narrow and directed toward the UE, and wherein the second DL transmit beam pattern during the UL transmission time period has a wide main lobe that is much wider than the narrow main lobe of the first DL transmit beam pattern during the DL transmit time period. In the case of a phased array that includes one or more gain elements for adjusting a transmission gain, the method further involves: during the DL transmission time period setting said gain elements to produce a first transmission gain; and during the UL transmission time period setting said gain elements to produce a second transmission gain, wherein the second transmission gain is lower than the first transmission gain.

BRIEF DESCRIPTION OF THE DRAWINGS

FIG. 1 chart of Time Division Multiplex operational modes according to 3GPP 36.211 v14.0.0, Section 4.2.

The details of one or more embodiments of the invention are set forth in the accompanying drawings and the description below. Other features, objects, and advantages of the invention will be apparent from the description and drawings, and from the claims.

DETAILED DESCRIPTION

Described herein is a way to further reduce the antenna gain to the UE. Antenna gain is typically defined as the power received in the direction of peak radiation as compared to the power that would be received if the source was a lossless isotropic antenna with the same input power. Antenna gain to the UE is similarly defined as the power received by the UE (or at the location of the UE) as compared to the power that would be received if the source was a lossless isotropic antenna with the same input power.

In a conventional base station system, the Tx power is fed to an antenna with a fixed pattern and gain, thus the interference to the UEs during the UL transmission time is a directly related to the Tx residual power level. If one uses an analog phased array system, such as the one described in greater detail later, directional beams can be employed, and antenna gain to the UE can be changed by simply changing the direction in which the main lobe of the beam is pointed. In the phased array system, the antenna pattern and gain are programmable via the phase weights applied to each of the antenna elements in the array. And if the phased array system is designed with both independent transmit and receive beam forming and fast beam switching capabilities, then the transmitter antenna pattern can be changed during the UL transmission time. So, by pointing the beam away from the UE, one can further reduce the antenna gain to the UE and also minimize the interference with the UE's transmissions.

Employing this technique enables one to gain at least a 17 dB advantage in UE interference from the DL power level during the UL transmission time. To obtain this advantage, the system switches to a "decorrelated" beam state on the DL transmission beam during the UL transmission time, and then it switches back to the desired DL transmission beam pattern during the DL transmission time. In short, the phase adjusting elements in the phased array system are used to further reduce the antenna gain to the UE. Since the analog phased array system can switch between beams very quickly, this produces a major advantage over other beamforming systems when operating in TDD mode.

The following are some examples of different approaches for minimizing interference caused by the base station's transmit beam during the UL transmission time.

Figure 2B:
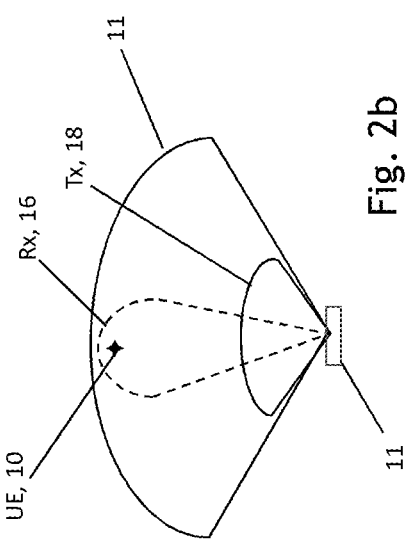
FIG. 2b illustrates idealized representations of downlink transmit (Tx) and receive (Rx) beams that are employed during uplink transmission times according to one embodiment of the invention.
Figure 2A:
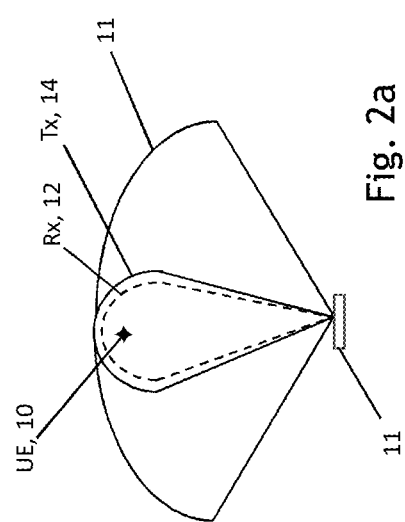
FIG. 2a illustrates idealized representations of downlink transmit (Tx) and receive (Rx) beams that are employed during downlink transmission times.

One approach is to change the shape of the DL transmit beam during the UL transmission times as compared to the shape employed during the DL transmission times. This is illustrated by FIGS. 2a and 2b. FIG. 2a shows a downlink transmit (Tx) beam 14 and a receive (Rx) beam 12 that are employed during the DL transmission times to provide coverage within a sector 11 or region that is serviced by a phased array antenna 13. Both beams are shown in this example as being narrow beams having basically the same shape and both are directed at a UE 10. Of particular importance is that the DL transmit beam 14 is a high gain beam with respect to the UE 10. High gain refers to the gain of the antenna that is normally being used for the TDD sector. This can be a narrow beam of maximum antenna array gain or some other reduced gain shape that was chosen for the operation of that particular sector.

In contrast, FIG. 2b shows the downlink transmit and receive beams 18 and 16, respectively, that are employed during the UL transmission times. What is to be noted here is that the shape of the DL transmit beam 18 is changed significantly from the shape that was used during the DL transmission times. Now it is a wide, low gain beam for which the antenna gain to the UE 10 is significantly reduced. It is low gain with respect to the DL transmit beam 14 (see FIG. 2a) that is used during the DL transmission times. Also note that the shape of the receive beam 12 during the DL transmission time is of less importance and it is simply shown in FIG. 2a as being the same as what is used during the UL transmission times.

Another approach is to change the direction in which the DL transmit beam is pointing during the UL transmission times. This is illustrated buy FIG. 3. In this example, the DL receive beam 20 is a narrow beam that is directed at the UE 10; whereas the DL transmit beam 22 is a narrow beam but it is directed completely away from the UE 10. Redirecting of the DL transmit beam 22 away from the UE 10 in this way significantly reduces the antenna gain to the UE 10, which is the desired result. Though the figure shows changing the azimuthal direction of the transmit beam, a similar result could be achieved by changing its elevation (either up or down) relative to where the UE 10 is located.

Figure 4:
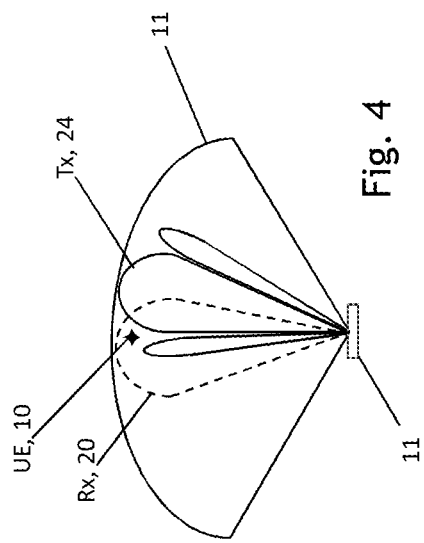
FIG. 4 illustrates idealized representations of downlink transmit (Tx) and receive (Rx) beams that are employed during uplink transmission times according to yet another embodiment of the invention.

Yet another similar approach is to change the direction in which the main lobe of the DL transmit beam 24 is pointing so that the UE 10 falls within one of the nulls of the transmit beam pattern, as illustrated by FIG. 4.

In one aspect, the approach described herein involves changing the transmit beam pattern, which may be done by changing the direction of the beam (either azimuthally or elevationally or both), or by changing the shape of the beam, in any case the effect of which is to reduce antenna gain at the location of the UE without having to change the gain adjusting elements in the phased array system.

Figure 3:
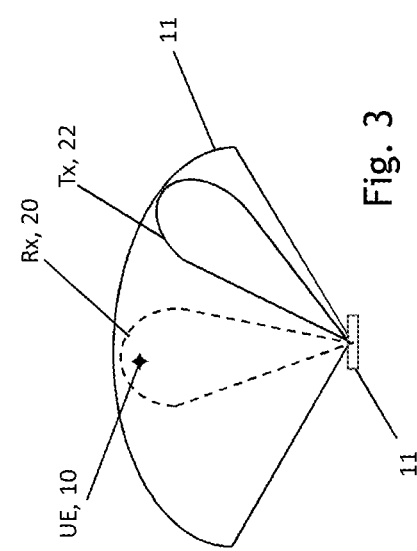
FIG. 3 illustrates idealized representations of downlink transmit (Tx) and receive (Rx) beams that are employed during uplink transmission times according to another embodiment of the invention.
Figure 5:
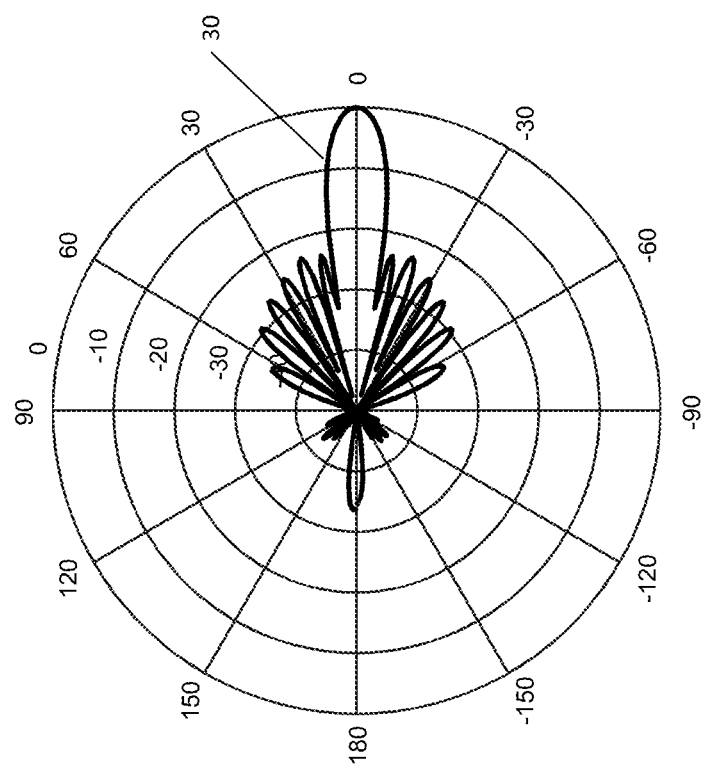
FIG. 5 illustrates a more accurate representation of an actual beam pattern.

It should be understood of course that the beam patterns depicted in FIGS. 2-4 are idealized representations. In reality, the patterns are much more complex than what is shown. A more accurate representation of the actual beam pattern 30 is shown in FIG. 5. It has a main lobe pointed in a particular direction and it has multiple, much smaller side lobes on each side of the main lobe. FIGS. 2-4 have focused primarily on the main lobe as that is the part of the beam pattern that is directed towards the UE for best signal strength. So, generally when the direction of a beam is mentioned, it is the direction of the main lobe that is being referred to.

By lowering the antenna gain during UL transmission times substantially in comparison to the DL transmission times this makes the implementation of the transmitter much easier and much less expensive in comparison to a conventional base station system because the residual noise of the transmitter does not have to be as stringently controlled in order to avoid interfering with the UE. In the case of a phased array, the reduction can quite possibly be 10 db, 20 dB, or even 30 dB. Also note that this approach can take particular advantage of the capabilities of analog phased array systems which can be designed for very fast beam switching with beam switching time on the order of 5 uSec.

An example of an analog phased array system that can be used to implement the approach described above is shown in FIG. 6-9.

Figure 6:
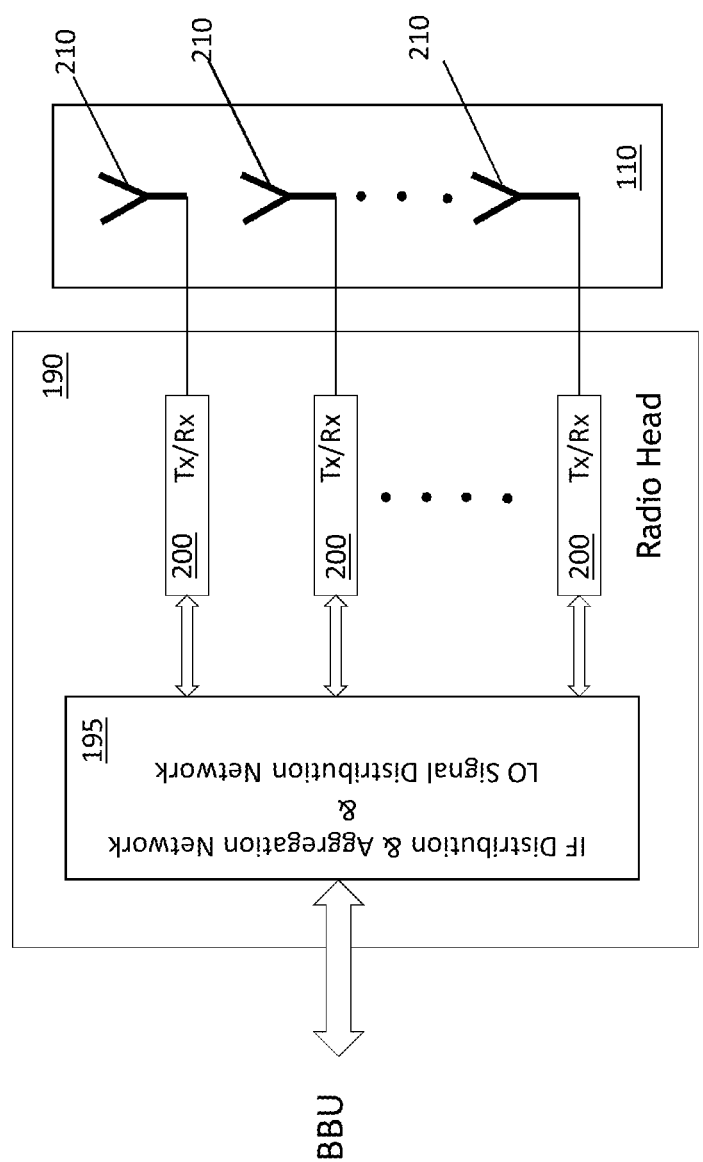
FIG. 6 is an exemplary high-level block diagram showing the internal structure of an exemplary radio head and phased array antenna.

Referring to FIG. 6, the antenna array 110 includes a two-dimensional array of M antenna elements. The radio head 190 includes multiple front-end modules (Tx/Rx modules) 200, equal in number to the number of antenna elements in the array, namely, M. There is a Tx/Rx module 200 for each antenna element. There is also a signal distribution network 195 that includes an IF distribution and aggregation network and an LO signal distribution network. This signal distribution network 195 delivers transmit signals from the BBU to the Tx/Rx modules 200, delivers received signals from the Tx/Rx modules 200 to the BBU, and provides coherent local oscillator signals to the Tx/Rx modules 200 for up-converting IF transmit signals to RF transmit signals and for down-converting RF received signals to IF received signals.

Figure 7:
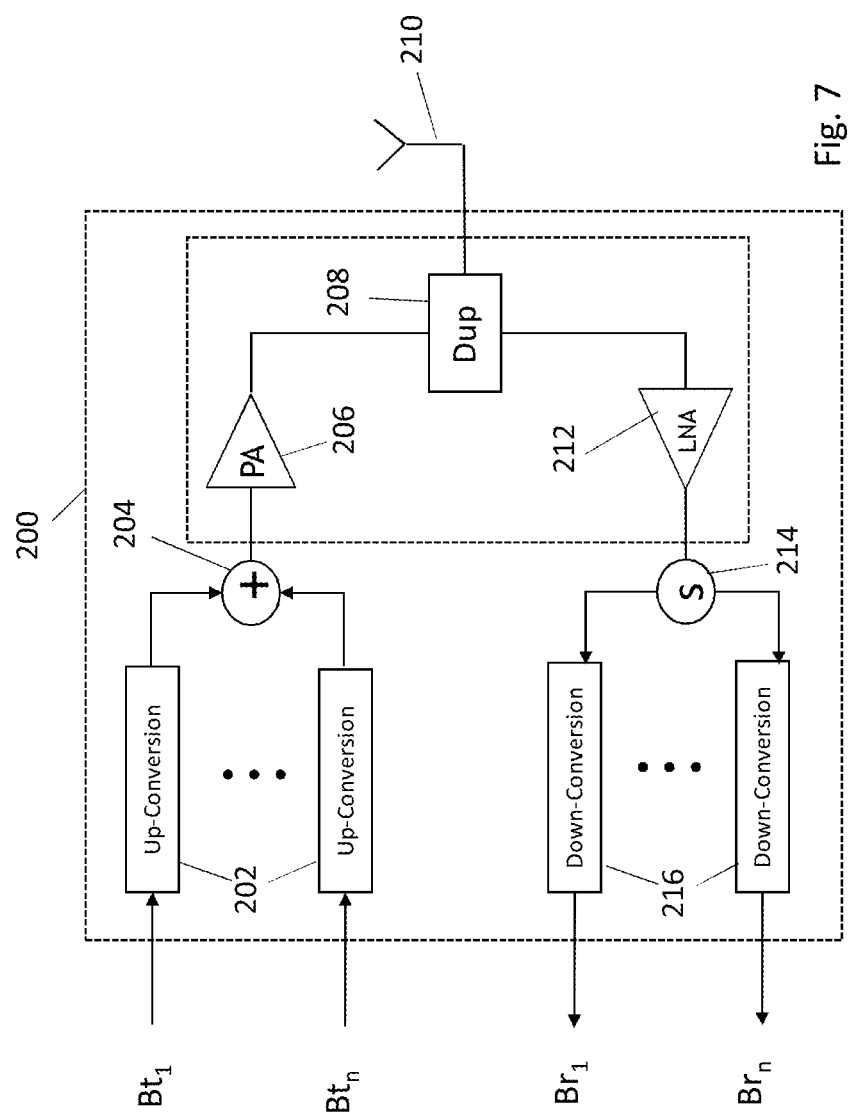
FIG. 7 is an exemplary high-level block diagram of a Tx/Rx module such as is shown in FIG. 6.

FIG. 7 shows a block diagram of the circuitry that connects to a single antenna element 210 of the multi-element antenna array. In the antenna array system having M antenna elements, this circuitry is duplicated for each antenna element. For each antenna element 210, there is a front-end module (or Tx/Rx module) 200 connected to the antenna element 210. The front-end module has a transmitter side and a receiver side. The transmitter side includes N up-conversion modules 202, a combiner circuit 204, and a power amplifier (PA) 206. The receiver side includes a low noise amplifier (LNA) 212, a splitter 214, and N down-conversion modules 216. The N up-conversion modules 202 enable the array to generate N independent transmit beams and the N down-conversion modules 216 enable the array to generate N independent receive beams. The front-end module 200 also includes a duplexer circuit 208 that couples the drive signal from the PA 206 on the transmitter side to the antenna element 210 and couples a received signal from the antenna element 210 to the LNA 212 on the receiver side. The input of each up-conversion module 202 is for receiving a different beam transmit signal stream $Bt_1 \ldots Bt_n$ from the baseband unit (not shown). And the output of each down-conversion module 216 is for outputting a different beam received signal stream $Br_1 \ldots Br_n$. Typically, each beam transmit signal stream is mapped to a different beam that is generated by the active antenna array system and each received signal stream corresponds to the signal received by a different receive beam formed by the active antenna array.

Figure 8:
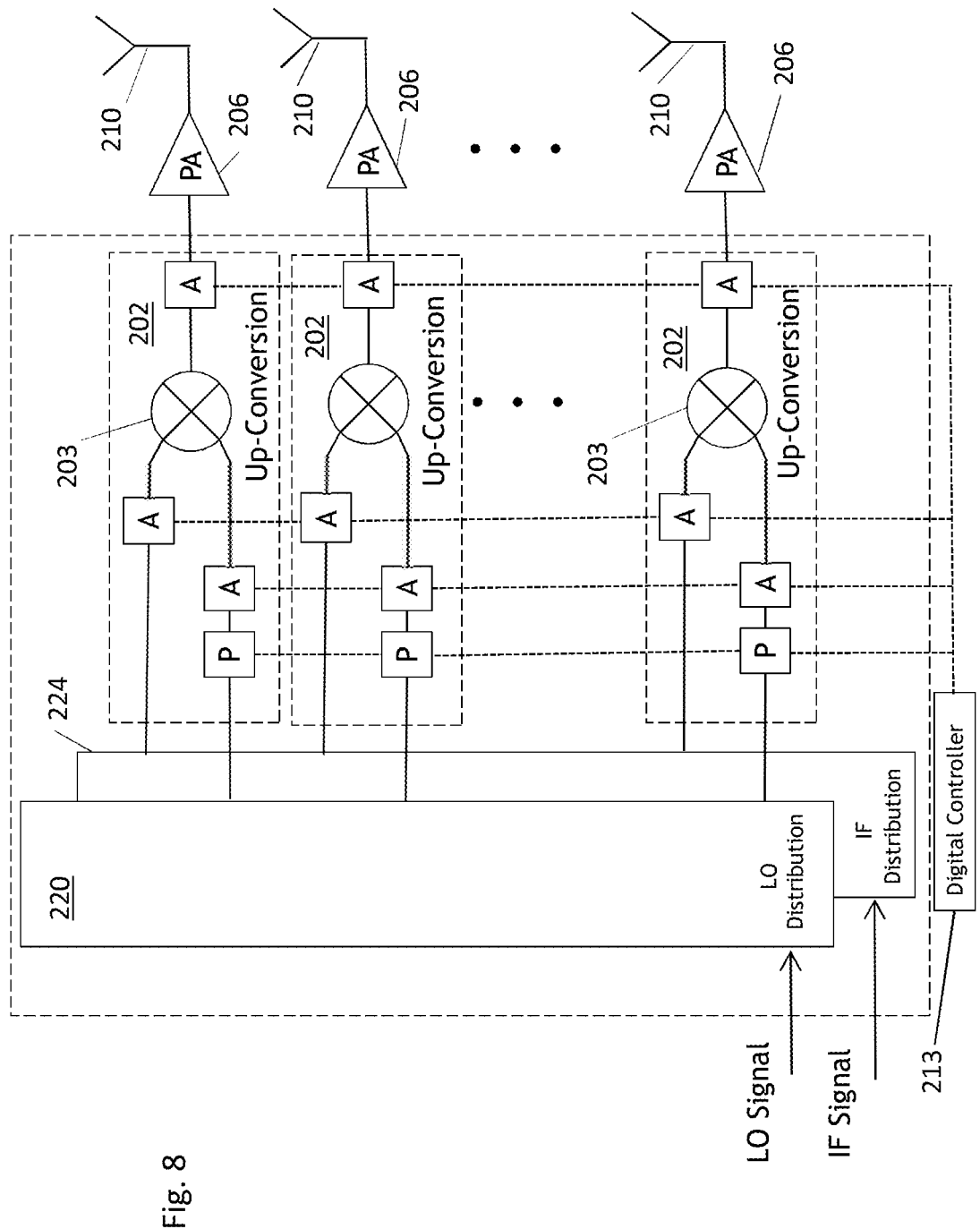
FIG. 8 is an exemplary block diagram of the transmitter side of an active antenna array system showing the circuitry for only one of multiple transmit beams.
Figure 9:
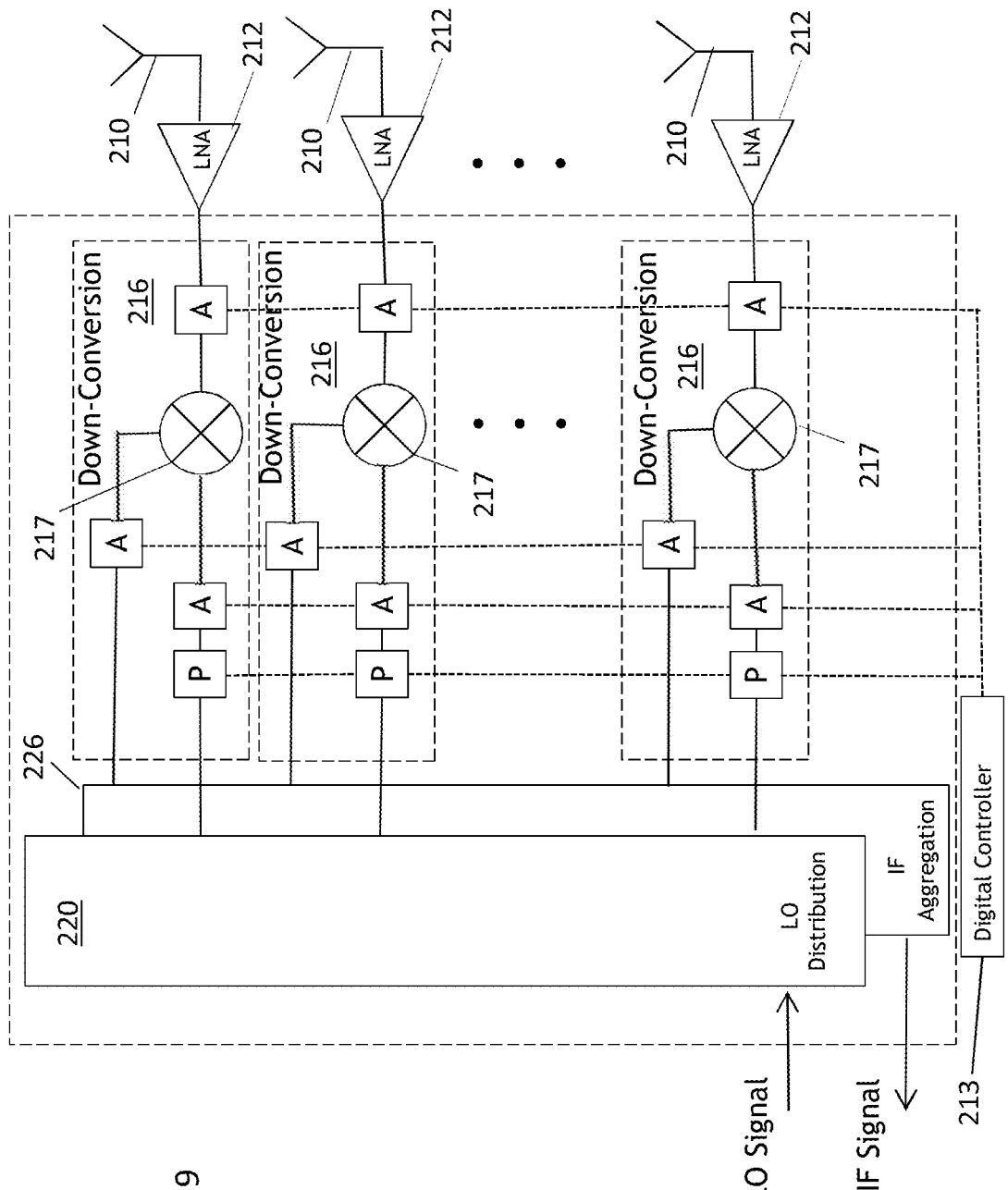
FIG. 9 is an exemplary block diagram of the receiver side of an active antenna array system showing the circuitry for only one of multiple receive beams.

An active antenna array system in which the up-conversion modules 202 are shown in greater detail is depicted in FIG. 8; and an active antenna array system in which the down-conversion modules 216 are shown in greater detail is depicted in FIG. 9. As a practical matter, these two systems, which are shown separately, would be implemented in the same active antenna array system but to simplify the figures, they are presented here separately. The active antenna array system of FIG. 8 is for transmitting one transmit signal stream over a single transmit beam that is generated by the M elements 210 of the antenna array. Because there is only one up-conversion module 202 for each antenna element 210, the combiner 204, which was shown in FIG. 7, is not necessary, so it has been omitted. Similarly, the active antenna array system of FIG. 9 is for receiving a signal stream on a single receive beam pattern that is generated by the antenna array. Again, because there is only one down-conversion module 216 for each antenna element 210, the splitter 214, which was shown in FIG. 7, is not necessary so it has also been omitted.

There is an LO distribution network 220 for distributing a coherent or phase synchronized LO (local oscillator) signal to the M up-conversion modules 202 and the M down-conversion modules 216. As shown in FIG. 8, there is also an IF distribution network 224 for delivering the IF transmit signal to each of the up-conversion modules 202. And as shown in FIG. 9, there is an IF aggregation network 226 for aggregating the received signals from each of the down-conversion modules 216.

The distribution and aggregation networks may be passive linear reciprocal networks with electrically identical paths to ensure the coherent distribution/aggregation of signals. Alternatively, one or more of these networks may be implemented using the bidirectional signaling network described in U.S. Pat. No. 8,259,884, entitled "Method and System for Multi-Point Signal Generation with Phase Synchronized Local Carriers," filed Jul. 21, 2008 and U.S. Pat. No. 8,622,959, entitled "Low Cost, Active Antenna Arrays," filed Jun. 30, 2011 or the serial interconnection approach described in U.S. Pat. No. 9,673,965, entitled "Calibrating a Serial Interconnection," filed Sep. 8, 2016, the contents of all of which are incorporated herein by reference.

In general, each up-conversion module 202 includes a mixer 203 and various amplitude and phase setting circuits identified by A and P, respectively. The LO signal and the distributed IF transmit signal stream are both provided to the mixer 203 which up-converts the IF transmit signal stream to an RF transmit signal stream that is provided to the power amplifier 206. Similarly, each down-conversion module 216 also includes a mixer 217 and various amplitude and phase setting circuits similarly identified by A and P, respectively. The mixer 217 in the down-conversion module 216 multiplies the LO signal provided by the LO distribution network 220 and the received RF signal stream from the low noise amplifier 212 that is coupled to the antenna element 210 to generate a down-converted IF received signal stream. The down-converted IF signal stream is provided to the IF aggregation network 226 for aggregation with the IF received signal streams from the other antenna elements and for transfer back to the base station.

The amplitude and phase setting circuits A and P are used for changing the relative phase or amplitude of individual antenna signals to thereby establish the size, direction, and intensity of the transmit and receive beam patterns that are generated by the antenna array. (Note: In an antenna array, a transmit beam is a radiation pattern that is generated by the antenna array. That radiation pattern can be measured in front of the antenna array. In contrast, a receive beam is not a radiation pattern formed by the antenna array but rather is a pattern of antenna sensitivity. Nevertheless, in spite of this difference, they are both generally referred to as beams.) The amplitude setting circuit is basically equivalent to a variable gain amplifier in which the ratio of the output signal amplitude to the input signal amplitude is programmable and is set by electronic control. The phase setting circuit has the fundamental capability of shifting the input signal in phase (or time) under electronic control. These amplitude and phase setting circuits are controlled by digital control signals supplied by a separate control processor 213.

The typology of the amplitude setting and phase setting circuits shown in FIGS. 8 and 9 is just one of many possibilities for giving the basic transmitter and receiver the capability to control independently the amplitude and phase values of the individual antenna signals. The number and placement of the amplitude and phase setting circuits can vary from what is illustrated in FIGS. 8 and 9. In addition, there are other components which might be present in the up-conversion and down-conversion modules but which are not shown in the figures because they are well known to persons skilled in the art. These might include, for example, channel IF filters and automatic gain controls.

Other embodiments are within the following claims.

What is claimed is:

1. A method of operating a phased array antenna system to communicate with a mobile user equipment (UE), said method comprising:
   when communicating with the UE, repeatedly switching between a downlink (DL) transmission time period and an uplink (UL) transmission time period;
   during the DL transmission time period, generating a DL transmit beam, wherein the DL transmit beam during the DL transmission time period has a first DL transmit beam pattern; and
   during the UL transmission time period, simultaneously generating a DL transmit beam and a DL receive beam, wherein the DL transmit beam during the UL transmission time period has a second DL transmit beam pattern and wherein the second DL transmit beam pattern during the UL transmission time period is different from the first DL transmit beam pattern during the DL transmission time period and wherein the second DL transmit beam pattern produces lower antenna gain to the UE as compared to the first DL transmit beam pattern.

2. The method of claim 1, further comprising:
   during the DL transmission time period, while generating the DL transmit beam simultaneously generating a DL receive beam.

3. The method of claim 2, wherein the second DL transmit beam pattern during the UL transmission time period is substantially different from the first DL transmit beam pattern during the DL transmission time period.

4. The method of claim 3, wherein the first DL transmit beam pattern during the DL transmission time period has a main lobe and the second DL transmit beam pattern during the UL transmission time period has a main lobe, wherein the main lobe of the first DL transmit beam pattern during the DL transmission time period is directed at the UE, and wherein the main lobe of the second DL transmit beam pattern during the UL transmission time period is directed away from the UE.

5. The method of claim 4, wherein the main lobe of the second DL transmit beam pattern during the UL transmission time period is directed away from the UE in an azimuthal direction.

6. The method of claim 4, wherein the main lobe of the second DL transmit beam pattern during the UL transmission time period is directed away from the UE in an elevational direction.

7. The method of claim 3, wherein the first DL transmit beam pattern during the DL transmission time period has a main lobe, multiple side lobes, and multiple nulls and wherein the second DL transmit beam during the UL transmission time period has a main lobe, multiple side lobes, and multiple nulls, wherein the main lobe of the first DL transmit beam pattern during the DL transmission time period is directed at the UE, and wherein second DL transmit beam pattern during UL transmission time period is directed so that the UE lies within one of the multiple nulls of the second DL transmit beam pattern.

8. The method of claim 3, wherein the first DL transmit beam pattern during the DL transmission time period has a main lobe and the second DL transmit beam pattern during the UL transmission time period has a main lobe, wherein the main lobe of the first DL transmit beam pattern during the DL transmission time period is narrow and directed toward the UE, and wherein the second DL transmit beam pattern during the UL transmission time period has a wide main lobe that is much wider than the narrow main lobe of the first DL transmit beam pattern during the DL transmit time period.

9. The method of claim 3, wherein the phased array includes one or more gain elements for adjusting a transmission gain and wherein said method further comprises:
   during the DL transmission time period setting said gain elements to produce a first transmission gain for the DL transmit beam for the DL transmission time period; and
   during the UL transmission time period setting said gain elements to produce a second transmission gain for the DL transmit beam for the UL transmission time period, wherein the second transmission gain is lower than the first transmission gain.

* * * * *